United States Patent [19]
Fischer

[11] Patent Number: 5,748,136
[45] Date of Patent: May 5, 1998

[54] ELECTRONIC LANDMARK ENHANCEMENT TO GPS BASED NAVIGATION SYSTEMS

[75] Inventor: Gregory M. Fischer, Cedar Rapids, Iowa

[73] Assignee: Rockwell International Corporation, Seal Beach, Calif.

[21] Appl. No.: 532,448

[22] Filed: Sep. 22, 1995

[51] Int. Cl.[6] ............................................ G01S 13/91
[52] U.S. Cl. ............................ 342/33; 342/43; 342/46
[58] Field of Search ........................... 342/33, 36, 37, 342/38, 43, 46, 63

[56] References Cited

U.S. PATENT DOCUMENTS

| | | | |
|---|---|---|---|
| 5,111,400 | 5/1992 | Yoder | 364/424.01 |
| 5,177,489 | 1/1993 | Hatch | 342/357 |
| 5,216,611 | 6/1993 | McElreath | 364/454 |
| 5,344,105 | 9/1994 | Youhanaie | 244/3.14 |
| 5,361,212 | 11/1994 | Class et al. | 364/428 |
| 5,438,337 | 8/1995 | Aguado | 342/357 |
| 5,450,329 | 9/1995 | Tanner | 364/449 |
| 5,506,587 | 4/1996 | Lans | 342/357 |
| 5,534,882 | 7/1996 | Lopez | 343/891 |

Primary Examiner—John B. Sotomayor
Attorney, Agent, or Firm—Gregory G. Williams; M. Lee Murrah; George A. Montanye

[57] ABSTRACT

A system and apparatus for enhancing the satellite based navigation systems which includes providing an aircraft with an interrogating radar for interrogating beacons disposed at a predetermined location in front of a runway wherein the beacons are radar-activated passively powered runway beacons.

6 Claims, 3 Drawing Sheets

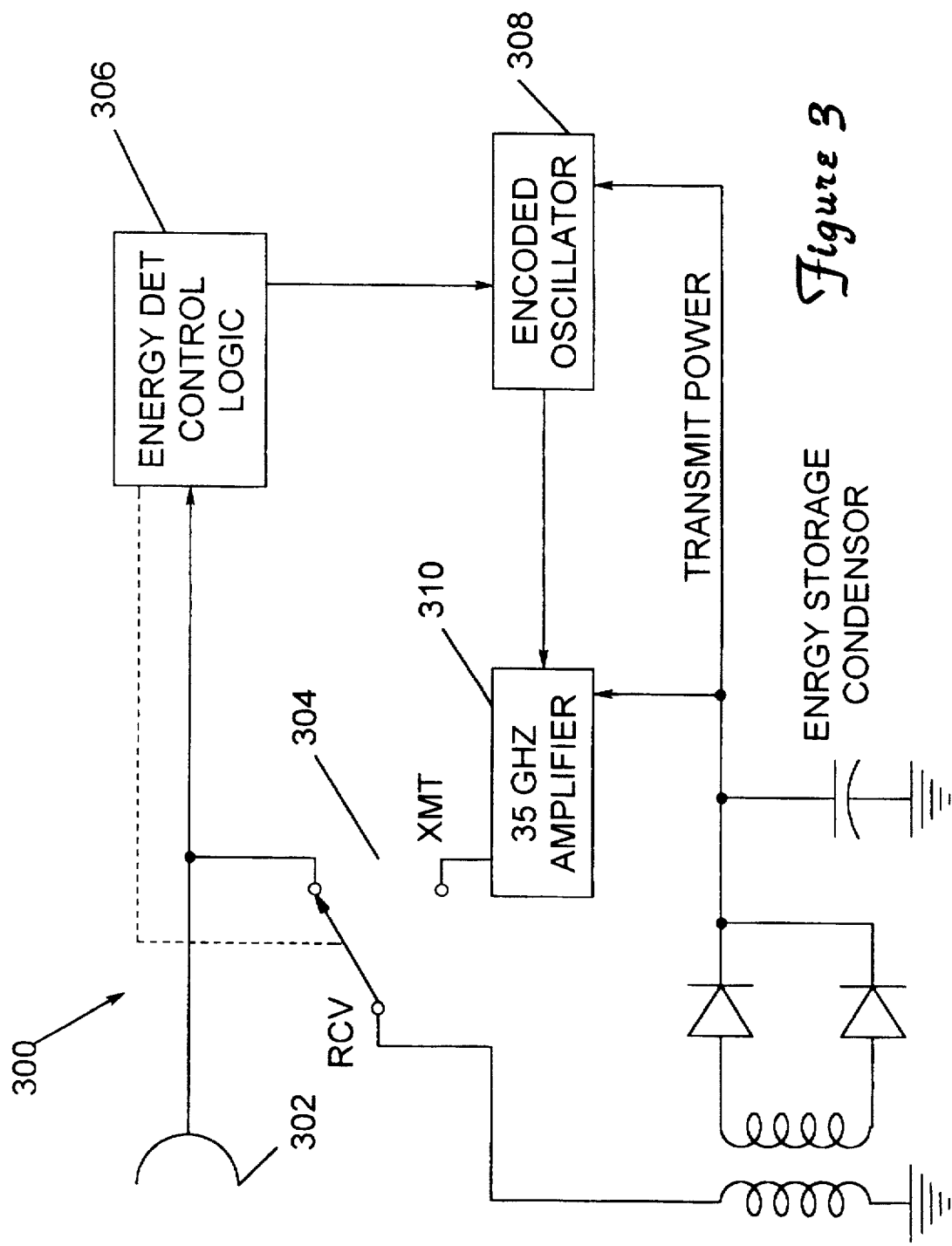

ELECTRONIC LANDMARK ENHANCEMENT TO GPS BASED NAVIGATION SYSTEMS

FIELD OF THE INVENTION

The present invention generally relates to aircraft navigation and landing and more particularly relates to systems for providing an electronic to enhance low visibility vehicular navigation.

BACKGROUND OF THE INVENTION

In the past, airlines have incurred substantial costs and delays each year as a result of low-visibility weather conditions. The infrastructure of many U.S. airports does not adequately support these operations. Lack of available runways, rated for CAT II and CAT III landings, causes aircraft rerouting, missed passenger connections, misplaced flight crews, and diversion operating costs. GPS brings the ability to perform precision approaches to nearly any runway, and low visibility landings provided the runway can be positively identified by independent means. Landing in low visibility CAT II/III requires positive identification of the runway environment, even when using new techniques such as GPS. This identification is currently facilitated through expensive runway lighting systems which provide an unambiguous visual signature. Some proposed solutions to this problem in the past have included heads-up guidance systems, with various radar-based imaging systems. The goal of these systems has been to provide a very high probability that guidance information is reliable through the use of imaging radar. While these methods might be able to provide some enhanced reliability, they do have several serious drawbacks. The head-up guidance systems with imaging sensors, which are combined to form an Enhanced Vision System (EVS), all attempt to provide additional integrity. However, low image quality and high cost of imaging radar sensors raises questions as to whether the runway environment can be positively identified based upon image reflections alone.

Consequently, there is an existing need for improvement in aircraft navigation and landing systems, which overcome the need for expensive runway lighting systems and the problems associated with EVSs.

SUMMARY OF THE INVENTION

It is an object of the present invention to provide a system and apparatus for enhancing the integrity of GPS based navigation and landing systems.

It is a feature of the present invention to include a radar-activated passively powered runway beacon.

It is an advantage of the present invention to provide confirmation of positive unique runway identification during landing approaches.

It is another advantage to couple the unique signal received and decoded from the beacon with flight deck automation.

The present invention provides GPS based navigation systems with a radar-activated passively powered runway beacon which is used to satisfy the aforementioned needs, provide the previously propounded objects, include the above-described features and achieve the already articulated advantages. The invention is carried out in a "radar reflection-less system" in the sense that no reflection of radar signals transmitted from airborne radars is utilized to define airport characteristics.

Accordingly, the present invention provides a GPS based navigation system, an interrogating radar on board the aircraft and a radar-activated passively powered runway beacon disposed at a predetermined location about the airport runway.

BRIEF DESCRIPTION OF THE DRAWINGS

The invention may be more fully understood by reading the following description of the preferred embodiments of the invention, in conjunction with the appended drawings wherein:

FIG. 3 is a block diagram of a radar achieved passive transmitter of the present invention.

DESCRIPTION OF THE PREFERRED EMBODIMENT

Figure 1:
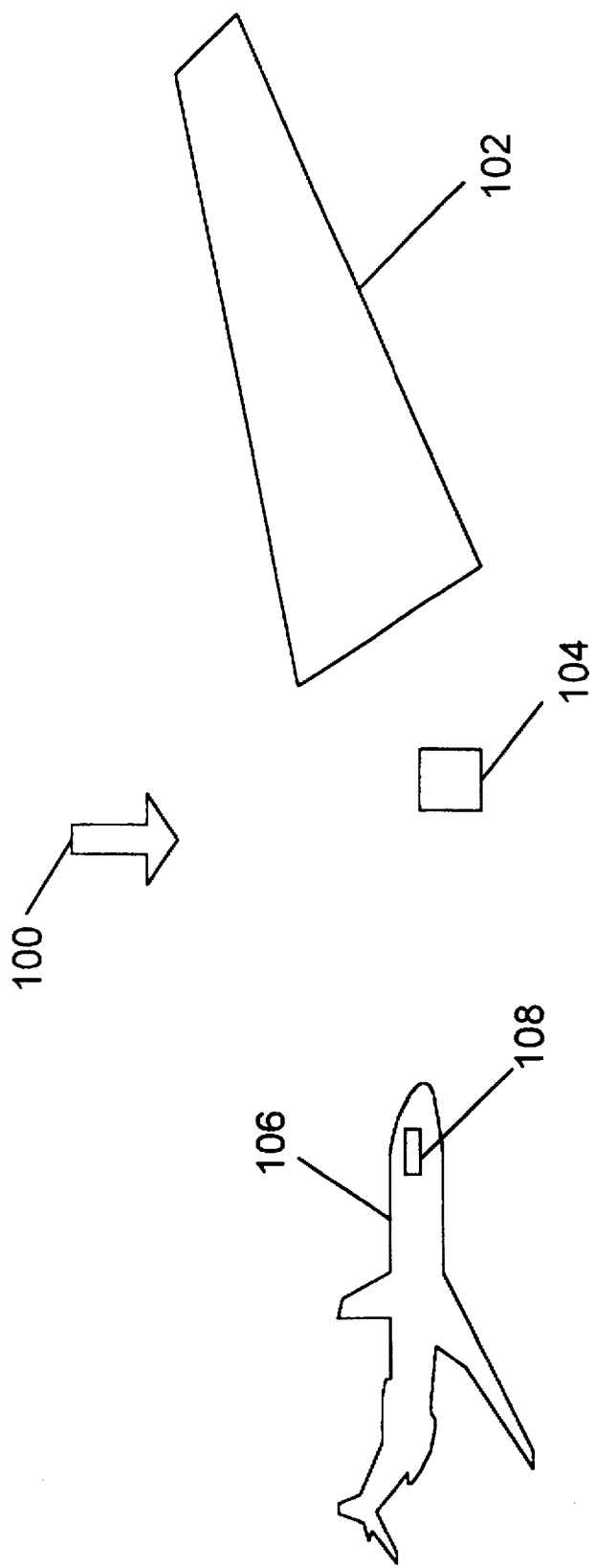
FIG. 1 is a prospective view of an aircraft interrogating a passive beacon which transmits a unique identification.

Now referring to the drawings where like numerals refer to like matter throughout, and now referring to FIG. 1, there is shown an airport vicinity, generally designated 100, having a runway designated 102 and a radar-activated passive beacon 104, shown disposed in front of the runway 102. Also shown is aircraft 106, which contains an interrogator 108, which is well known in the art and which scans and provides an interrogation signal in a predetermined angle; generally corresponding to the approach glidescope in front of the aircraft.

Figure 2:
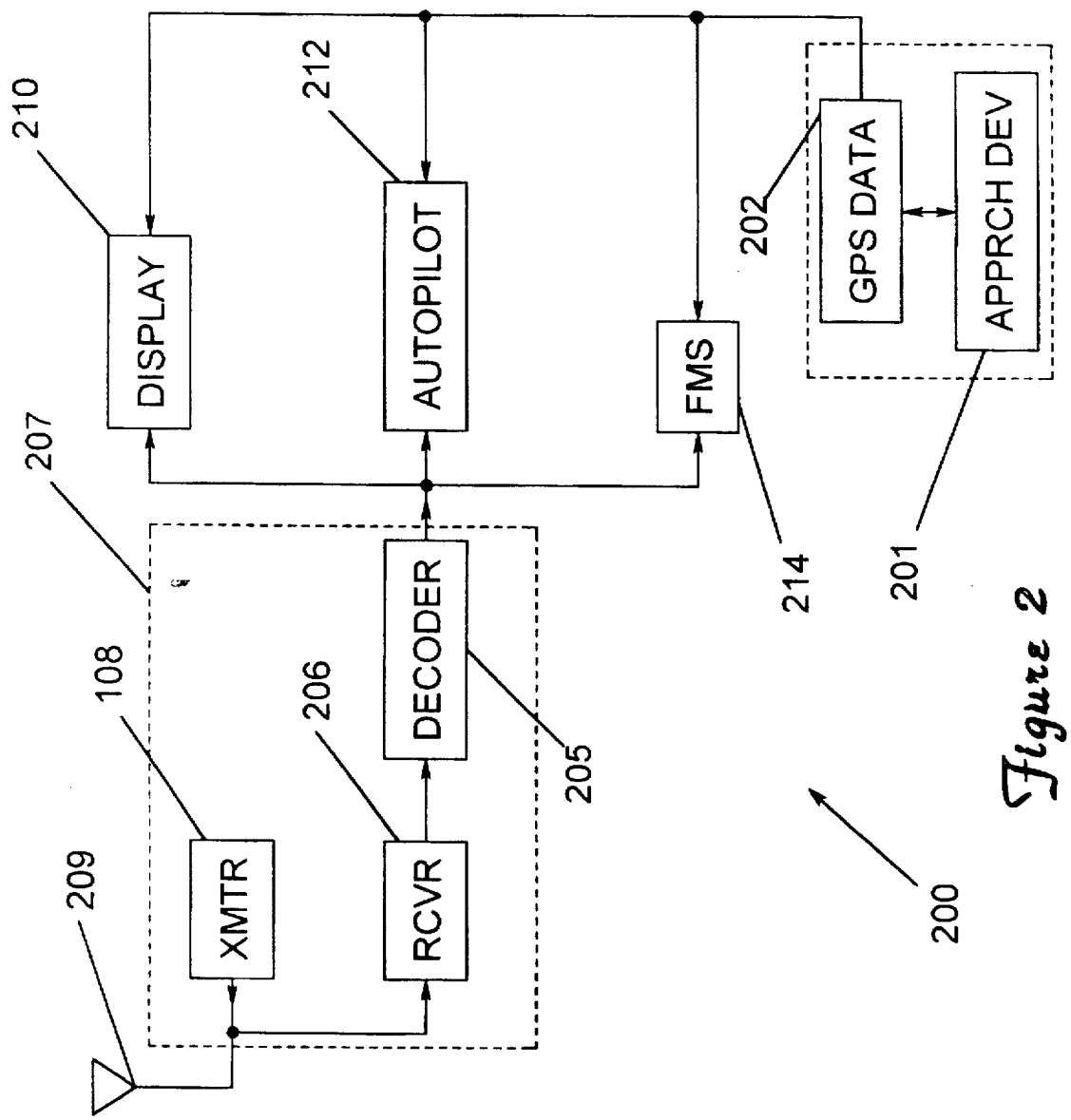
FIG. 2 is a block diagram of the system on board the aircraft, of the present invention.

Now referring to FIG. 2, there is shown an enhanced GPS based navigation system, generally designated 200, having a transceiver 207 and an approach deviation means 201 and GPS sensor system 202 which is well known in the art. Disposed in transceiver 207 is decoder 205. Coupled to decoder means 205 is the interrogator 108 (FIG. 1), which is capable of emitting electromagnetic radiation through antenna 209 in a forward direction from the aircraft 106 (FIG. 1). The interrogator 108 is preferably a scanning millimeter wave transceiver operating in a pulsed mode, however, any device capable of stimulating the beacon 104 to emit a signal could be substituted, such as an existing onboard weather radar. Also shown coupled to decoder means 205 is a receiver 206, which receives the digitally encoded signal transmitted by the beacon 104 (FIG. 1).

Decoder means 205 can be any device, system or algorithm capable of decoding the unique digitally encoded signal from the beacon 104 for confirmation of proper position as indicated by the GPS 202. The decoder is shown, for convenience of illustration, as a separate box, however, in a preferred embodiment the decoder 205 might be resident within the transceiver 207 (shown by dotted lines), where existing circuitry and processing capabilities could be utilized. Decoder means 205 provides an output indicating airport and runway number to existing avionics equipment, such as display system 210, autopilot 212, and flight management system 214.

Now referring to FIG. 3, there is shown a radar activated passive transmitter, of the prior art, generally designated 300 which includes an antenna 302, switch 304, energy detection logic 306, encoded FM oscillator 308 and power amplifier 310. Switch 304 is preferably realized in micromachined silicon and amplifier 310 and oscillator 308 in SiGe for low power, high frequency operation. Switch 304 is normally in receive mode. Detection logic 306 tells the switch to change states, oscillator 308 and power amplifier 310 to preferably turn on, when energy from interrogator 108 is incident thereon. RF energy is rectified and stored to be used briefly by power amplifier and oscillator (less than 1 m.s.). The digital message can be pre-programmed into FM oscillator 308 and with only 64 bits in total length. A very short transmission cycle with highly directional antenna 302 results in a very low power requirement transmitter with a range of approximately 2000 feet.

In operation, a member of the flight crew will, upon approach for landing, activate the interrogator 108 which transmits an interrogation signal to be received by beacon 104, which then transmits a unique identification and information signal to receiver 206 on aircraft 106 where confirmation of the runway is achieved.

It is thought that the GPS based satellite navigation system, of the present invention, and many of its attendant advantages will be understood from the foregoing description and it will be apparent that various changes may be made in the form, construction and arrangement of the parts thereof without departing from the spirit and scope of the invention or sacrificing all of its material advantages, the form herein before described being merely a preferred or exemplary embodiment thereof.

I claim:

1. An aircraft landing system comprising:

a global positioning system on board an aircraft for generating a present position report for the aircraft;

an interrogating radar, coupled to the aircraft for providing an interrogating signal in a predetermined direction, with respect to a flight direction of the aircraft;

a radar-activated passively powered runway beacon disposed at a predetermined location near an aircraft runway which transmits a unique identification signal when interrogated by the aircraft; and a receiver disposed upon the approaching aircraft which receives the unique identification signal.

2. A navigation system, on board an aircraft, comprising:

a radar transceiver, on the aircraft, for interrogating a beacon disposed at a predetermined location with respect to an aircraft runway;

the transceiver further for receiving an encoded message from the beacon, which identifies the runway;

the transceiver coupled to a means for providing information to a pilot; and the means for providing information to the pilot is coupled to a GPS receiver which provides information relating to a location of the aircraft.

3. A system of claim 2, wherein the means for providing information comprises a display.

4. A system of claim 2, wherein the means for providing information to a pilot comprises an enunciator.

5. A system of claim 2, wherein the means for providing information to a pilot comprises a flight management system.

6. An aerial navigation system comprising:

a radar transmitter for interrogating a beacon disposed at an airport;

a beacon receiver for receiving encoded messages from the beacon;

a directional antenna selectively coupled to the transmitter and the beacon receiver;

a digital decode logic means coupled to the beacon receiver for decoding the message received from the beacon and outputting a runway identification signal;

a display system coupled to the digital decode logic means for receiving the runway identification signal and for providing a pilot with an image generated in response to the runway identification signal; and a GPS receiver for generating position information of an aircraft, the GPS receiver coupled to the display system, the display system generating a representation to the pilot in response to a signal output from the GPS receiver.

* * * * *